(No Model.)
W. MARTIN.
HOSE COUPLING.
No. 525,854.  Patented Sept. 11, 1894.
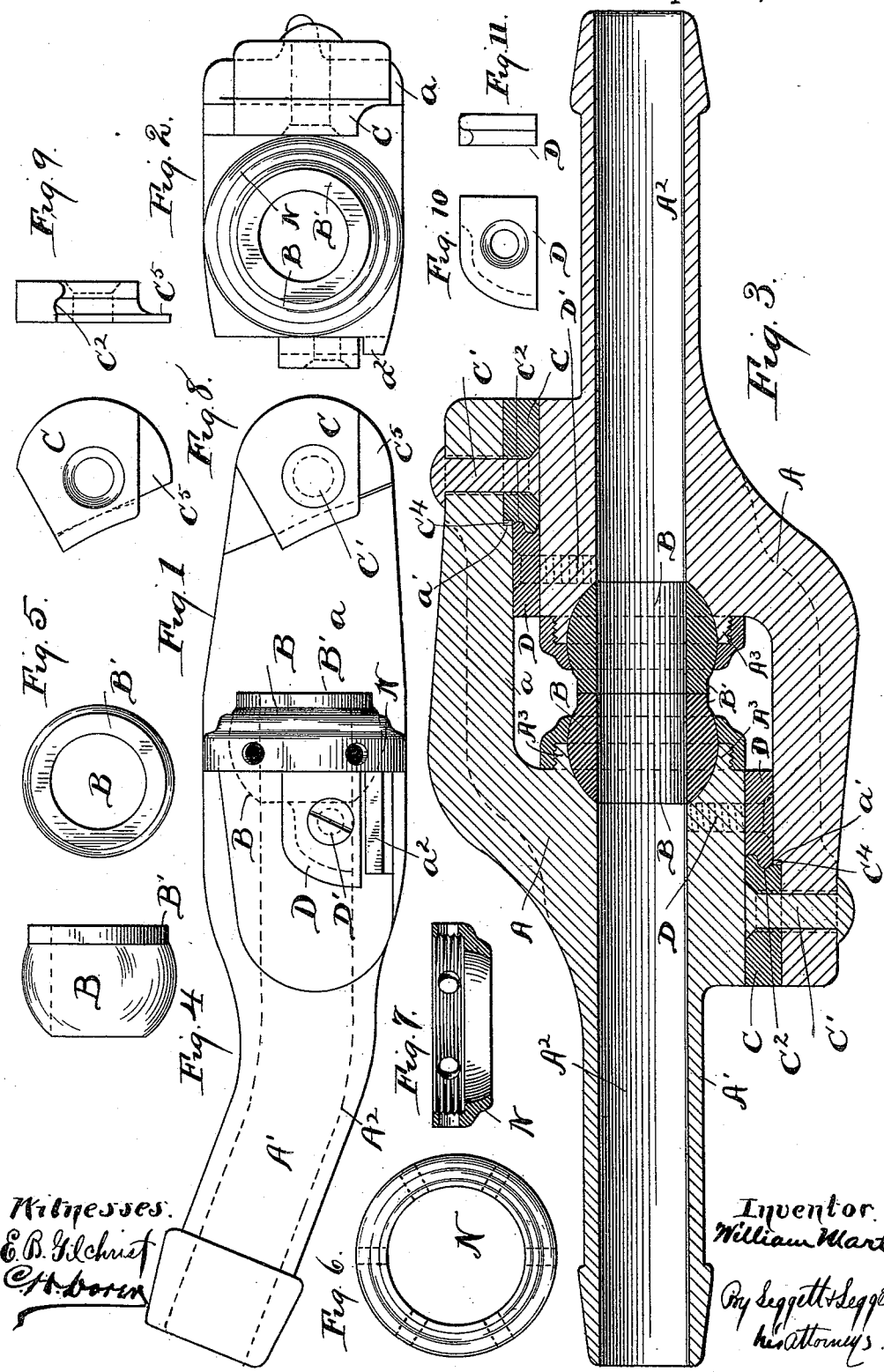
Witnesses
E. B. Gilchrist
C. H. Doren
Inventor
William Martin
By Leggett & Leggett
his attorneys.

UNITED STATES PATENT OFFICE.

WILLIAM MARTIN, OF DUNKIRK, NEW YORK.

HOSE-COUPLING.

SPECIFICATION forming part of Letters Patent No. 525,854, dated September 11, 1894.

Application filed January 24, 1893. Serial No. 459,569. (No model.)

*To all whom it may concern:*

Be it known that I, WILLIAM MARTIN, of Dunkirk, in the county of Chautauqua and State of New York, have invented certain new and useful Improvements in Hose-Couplings; and I do hereby declare the following to be a full, clear, and exact description of the invention, such as will enable others skilled in the art to which it pertains to make and use the same.

My invention relates to improvements in couplings for uniting together sections of hose or flexible or jointed pipe, such, for instance, as the steam-heating or air-brake pipes of railway cars, the object being to provide a coupling, for the purpose indicated, that is more secure against leakage, more durable and simple in construction and more universally applicable than the couplings heretofore devised.

With this object in view, my invention consists in certain features of construction and in combination of parts hereinafter described and pointed out in the claims.

In the accompanying drawings, Figure 1 is an inner side elevation of a member or one-half of a coupling embodying my invention and Fig. 2 is an end elevation of the same. Fig. 3 is a plan view in central longitudinal section of the two members or halves of the coupling joined together. Fig. 4 is a side elevation of one of the oscillating-washers bearing the meeting-face and Fig. 5 is an outer end elevation of the same. Fig. 6 is an end elevation of the nut for holding said washer to its seat and Fig. 7 is a transverse section on line 7—7 Fig. 6. Fig. 8 is a side elevation of a locking disk C detached and Fig. 9 is a left-hand side elevation relative to Fig. 8. Fig. 10 is a side elevation of a locking-plate D detached, and Fig. 11 is a left hand side elevation relative to Fig. 10.

Both members or halves of the coupling are alike, each half consisting of a body portion, A, having a slight upwardly-turned neck or extension, A', both of which are bored centrally, as at $A^2$, to form, with the hose or flexible pipe to be coupled, a continuous passage.

The meeting-face of each half of the coupling is formed by the inner annular flat or facial surface $b$ of an externally spherical or ball-shaped washer B that is suitably seated, in a corresponding annular recess at the inner end of the body portion of the coupling, the central opening $b'$ through said washer registering with or forming a continuation of the passage-way $A^2$ in body portion A and neck or shank A' of the member of the coupling. Said spherical or ball-shaped washer is preferably composed of a somewhat elastic composition, such as vulca-beston. A washer B is shown detached in Figs. 4 and 5.

A portion of the seat for spherical or ball-shaped ring or washer B is formed by an annular inwardly-projecting externally screw-threaded flange, $A^3$, of the body portion of the half of the coupling, (see Fig. 3,) and also by a correspondingly externally threaded nut, N, mounted on said flange, said nut holding the spherical or ball-shaped ring or washer securely in place, the nut being shown detached in Figs. 6 and 7.

By the construction just described, it will be observed that the spherical or ball-shaped disk or ring B is adapted to oscillate in every direction, and hence no matter if the presenting or meeting-face of oscillating washer or ring of one-half of the coupling is worn at one side, or not exactly true, the capability of the meeting-faces of the members of the coupling to oscillate in every direction, enables them to readily conform to each other.

The spherical ring or washer, at its outer end, is provided with an annular shoulder B', adapted to form a stop to limit the oscillation of the ring or washer, the location of said shoulder being such as to permit the desired oscillation and at the same time prevent any portion of the meeting-face of the washer from moving inside of the securing-nut.

The body portion A is provided, at its outer side, with a flat arm or extension, $a$, that, at its outer end and inner side, has pivoted thereto, as at C', a rocking or oscillating plate C. Oscillating plate C is shown detached in Figs. 8 and 9. Said disk is undercut at its inner edge, as at $C^2$, and the plate is preferably of such shape that said edge lies or extends diagonally in an upwardly and inwardly-inclined direction across the central portion of the inner side of arm or member $a$ of the body portion of the coupling. The inner edge of plate C, as shown very clearly in Figs. 1, 8, and 9, at the inner side of the plates is provided with a straight shoulder $C^4$ extending approximately parallel with the inner edge of the plate, and shoulder $C^4$ extends preferably parallel with but is separated a small interval, preferably about one sixty-fourth of an inch, from a shoulder $a'$ formed on the inner side of arm or member $a$ by a reduction of the thickness of said arm or member, shoulder $a'$ therefore extending diagonally across arm $a$ in an upwardly and inwardly-inclined direction. Disk C is preferably enlarged downwardly, as at $C^5$, to elongate shoulder $C^4$. By means of the slight clearance had between shoulders $a'$ and $C^4$, it will be observed that said plate is capable of rocking or oscillating a limited distance in either direction.

The undercut edge of plate C of each half of the coupling is adapted to be engaged by the corresponding edge of a similar rocking or oscillating plate D pivoted, as at $D'$, to the inner side of the body portion of the other or companion half of the coupling, the oscillating or rocking motion of plate D being limited by a straight shoulder or flange $a^2$ formed on the inner side of the respective half of the coupling a suitable distance below said disk. (See Figs. 1 and 2.)

It will be observed that when the two halves of the coupling are brought together in coupling, so that plate C of each half meshes with plate D of the companion half, upon releasing the coupling, its own weight will cause it to drop, as it were, and thereby bring the faces of the two balls or spheres together, thereby forming a joint. The trend of the undercut portion of oscillating plates D is such that said disks shall not only be adapted to mesh with plate C on the companion half of the coupling but shall also afford a bearing for said plate C. The neck or shank of the coupling, being on an angle, when a tension is put on the hose, it attempts to straighten the coupling out and thereby lifts or disengages plate C from plate D on the opposite half of the coupling. A plate D is shown detached in Figs. 10 and 11.

By my improved construction there is no liability of leakage, and a slight variation in the length of plates C and D, or wearing of their surfaces, will not, owing to their universal oscillating capability, affect their capacity of securely locking the members of the coupling together and establishing a tight joint at the meeting-faces.

Referring again to the feature of my invention of the universally oscillating meeting-face hereinbefore referred to and whereby the members of the coupling are enabled to move around and conform to one another, I would also remark that, having the universal motion indicated, the meeting-faces will wear more uniformly.

I would also remark that one half or member of a hose-coupling, whose meeting-face has a universal motion as hereinbefore described, is also well adapted for use with a companion member whose meeting-face has not said oscillating capability, and I therefore desire to have it understood that my invention not only comprises a coupling the meeting-faces of both members whereof have a universally oscillating motion but also embraces a coupling but one of whose members is provided with a meeting-face possessing said peculiarity.

What I claim is—

1. In a hose-coupling consisting of duplicate sections, each provided with a meeting face adapted to form a tight joint when brought together, oscillating locking plates on each section limited in their movement by stops, and adapted to engage and interlock with the oscillating locking plates on a duplicate coupling section and oscillate thereon so as to draw the meeting faces of the coupling sections together into close contact when two such coupling sections are brought together.

2. In a hose-coupling member, having a continuous straight way passage therethrough, and a meeting face at the outer end of said passage, a rocking or oscillating plate on one side of the body of the coupling member, an arm extending forward from the opposite side of the body of the coupling member beyond the meeting face thereof, and a rocking or oscillating plate on said arm adapted to engage or interlock with the oscillating plate on the body of a duplicate coupling member, substantially as and for the purpose set forth.

3. In a hose-coupling consisting of two duplicate sections of suitable construction to form a joint against leakage between the meeting faces thereof when coupled together, an oscillating plate secured to one side of the body portion of each section and means thereon for limiting the oscillation of said plate, an arm extending forward from the opposite side of the body of each section beyond the meeting face thereof, an oscillating plate secured to the end of said arm, and means thereon for limiting the oscillation of said plate, which plate is adapted to engage and interlock with the oscillating plate on the duplicate section of the coupling, substantially as set forth.

4. A hose-coupling consisting of two sections or members, each member comprising a body portion, an oscillating locking plate pivoted to one side of the body portion of each section and an arm on the opposite side extending forward longitudinally beyond the meeting face thereof, an oscillating locking plate pivoted to the inner side of said arm, and stops for limiting the oscillation of said locking plates, the locking plates on the body portion and on the arm being under-cut, substantially as shown, so as to engage and interlock with each other when two sections of the coupling are brought together, substantially as set forth.

In testimony whereof I sign this specification, in the presence of two witnesses, this 17th day of December, 1892.

WILLIAM MARTIN.

Witnesses:
  C. H. DORER,
  SARAH MARTIN.